(12) United States Patent
Zhao et al.

(10) Patent No.: US 11,733,550 B2
(45) Date of Patent: *Aug. 22, 2023

(54) ULTRAMINIATURE DYNAMIC SPEAKER FOR A FULLY IN-EAR MONITOR

(71) Applicant: Meta Platforms Technologies, LLC, Menlo Park, CA (US)

(72) Inventors: Chuming Zhao, Redmond, WA (US); Drew Stone Briggs, Seattle, WA (US); Michael Edward Franks, Snoqualmie, WA (US); Derek Wallin, Monroe, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,219

(22) Filed: Jul. 19, 2022

(65) Prior Publication Data
US 2022/0365375 A1 Nov. 17, 2022

Related U.S. Application Data

(63) Continuation of application No. 17/134,913, filed on Dec. 28, 2020, now Pat. No. 11,422,392.

(Continued)

(51) Int. Cl.
*G10K 11/16* (2006.01)
*G02C 11/00* (2006.01)
(Continued)

(52) U.S. Cl.
CPC .......... *G02C 11/10* (2013.01); *G02B 27/0176* (2013.01); *G10K 11/17827* (2018.01);
(Continued)

(58) Field of Classification Search
CPC .............. G02C 11/10; G10K 11/17827; G10K 2210/1081; G10K 2210/506; G02B 27/0176; G02B 2027/0178; H04R 1/1016
(Continued)

(56) References Cited

U.S. PATENT DOCUMENTS 11,422,392 B2 * 8/2022 Zhao ...................... G02C 11/10
2007/0160243 A1 7/2007 Dijkstra et al.
(Continued)

OTHER PUBLICATIONS

International Search Report and Written Opinion for International Application No. PCT/US2021/052724, dated Jan. 25, 2022, 11 pages.

*Primary Examiner* — Ammar T Hamid
(74) *Attorney, Agent, or Firm* — Fenwick & West LLP

(57) ABSTRACT

An in-ear device is implemented as part of an audio system to present a user with improved audio content within an artificial reality system. The in-ear device is a fully integrated device with an internal microphone, an external microphone, and a transducer in which portions of the transducer form portions of the body of the device. This integration of transducer into the body of the in-ear device reduces the size of the in-ear device and allows for placement deeper within the ear canal of the user. The transducer generates audio content based on instructions received from an audio system that may be located on a device that is external to the in-ear device. The external microphone provides hear-through functionality, while the internal microphone provides feedback information to the audio system.

19 Claims, 8 Drawing Sheets

Related U.S. Application Data

(60) Provisional application No. 63/087,785, filed on Oct. 5, 2020.

(51) Int. Cl.
*G02B 27/01* (2006.01)
*H04R 1/10* (2006.01)
*G10K 11/178* (2006.01)

(52) U.S. Cl.
CPC ... *H04R 1/1016* (2013.01); *G02B 2027/0178* (2013.01); *G10K 2210/1081* (2013.01); *G10K 2210/506* (2013.01)

(58) Field of Classification Search
USPC ........................................ 381/71.1, 7.1, 71.2
See application file for complete search history.

(56) References Cited

U.S. PATENT DOCUMENTS

| | | | |
|---|---|---|---|
| 2010/0086169 A1* | 4/2010 | Kaiya | H04R 9/02 |
| | | | 381/400 |
| 2014/0016804 A1* | 1/2014 | Burns | H04R 25/658 |
| | | | 381/312 |
| 2016/0234594 A1* | 8/2016 | Ogura | H04R 1/086 |
| 2018/0020281 A1* | 1/2018 | Wurtz | A61F 11/08 |
| 2020/0178003 A1 | 6/2020 | Zurbruegg et al. | |
| 2020/0267475 A1 | 8/2020 | Kosuda et al. | |
| 2020/0382950 A1* | 12/2020 | Fornshell | H04W 4/80 |
| 2022/0030365 A1* | 1/2022 | Keady | B33Y 80/00 |

* cited by examiner

US 11,733,550 B2

ULTRAMINIATURE DYNAMIC SPEAKER FOR A FULLY IN-EAR MONITOR

CROSS REFERENCE TO RELATED APPLICATIONS

This application is a continuation of U.S. patent application Ser. No. 17/134,913, filed Dec. 28, 2020, which claims the benefit of U.S. Provisional Application No. 63/087,785, filed Oct. 5, 2020, both of which are incorporated by reference.

FIELD OF THE INVENTION

The present disclosure relates generally to an audio system in a headset, and specifically relates to facilitating bone and cartilage conduction technologies in the audio system.

BACKGROUND

Headsets often include features such as audio systems to provide audio content to users of the headsets. The audio content may be provided to the user using wearable in-ear devices. In traditional in-ear devices, the transducer is placed outside the ear canal. However, such placement of the transducer outside of the ear canal limits placement of the external microphone, which in turn leads to poor hear-through capability. Furthermore, in order to achieve satisfying loudness for the user, the transducer generally is relatively large.

SUMMARY

An in-ear device is implemented as part of an audio system to present a user with audio content. The in-ear device has a body that fits entirely within an ear canal of a user. The body includes a transducer with a diaphragm and a driver assembly that drives the diaphragm to produce audio content. A portion of the inner wall of the body of the device is coupled to a part of the driver assembly. The in-ear device receives sound from a local area of the user at an external port. The received sound is detected by an external microphone via the external port. The in-ear device has one or more internal ports that output audio content from the transducer to the ear canal and receive sound within the ear canal. An internal microphone detects the sound within the ear canal via an internal port.

BRIEF DESCRIPTION OF THE DRAWINGS

Figure (FIG. 1 is a perspective view of a headset including an audio system, in accordance with one or more embodiments.

Figure 1:
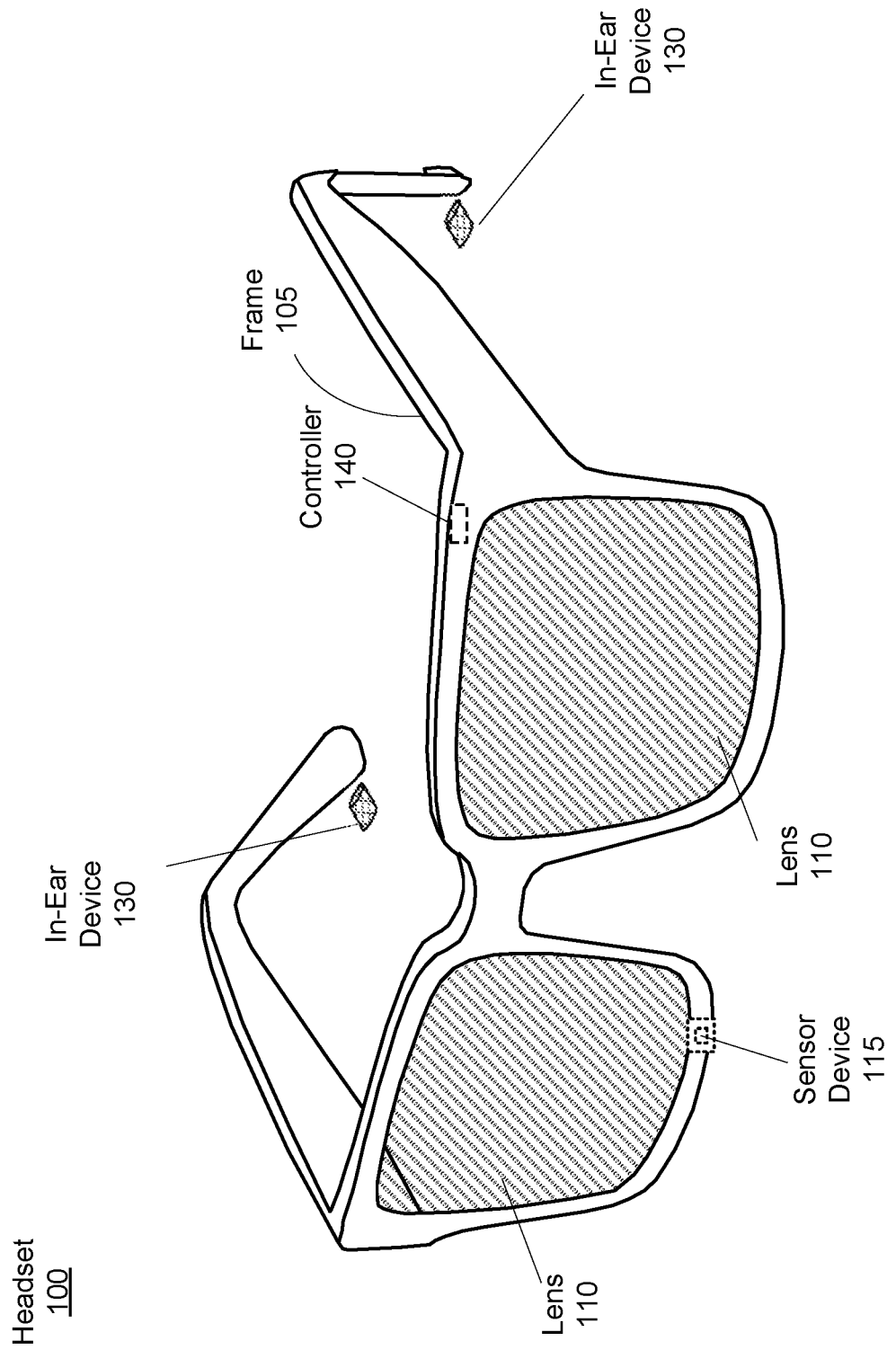

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to an integrated in-ear device for providing audio content to a user of the device that is configured to fit entirely within an ear canal of the user. The in-ear device includes a transducer, an internal microphone, and an external microphone. Embodiments described herein employ an ultra-small transducer so that the transducer, the internal microphone, and the external microphone are all located within a single housing, and together form the body of the in-ear device. Use of an ultra-small transducer that may be placed together with the internal and external microphones as part of a single body located within a single enclosure enables device miniaturization and package integration while ensuring target acoustic performance.

The transducer of the in-ear device receives vibration instructions from an audio system communicating with the in-ear device and generates audio content in the form of acoustic pressure waves within the ear canal of the user based on these instructions. The internal microphone detects acoustic pressure within the ear canal of the user, which may then be provided to the audio system as audio feedback. The external microphone detects acoustic pressure in the outer ear portion of the user, which may be then provided to the audio system for feedback as well as hear-through purposes.

Advantages of the in-ear device described herein arise from a configuration in which a portion of the body of the device and transducer components together form the transducer, leading to an ultra-small transducer. Thus, embodiments of the transducer described herein include a diaphragm, a driver assembly to drive the diaphragm to produce audio content, and a portion of an inner wall of the body to which portions of the driver assembly are coupled. The body of the device also includes other electronics such as the internal and external microphones. The small transducer size also facilitates development of a small in-ear device that may be placed within an ear canal of a user, and that enables a better fit for a majority of users. Furthermore, such placement within the ear canal of the user enables the small-size transducer to be able to provide a target level of loudness (i.e., audio content amplitude) for the user. This is in contrast to other devices that provide audio content in free air to the user in which the transducer is placed outside of the ear canal. Such outside placement of the transducer in the other devices requires that the transducer be large enough and produce large enough excursion to provide a target level of audio content amplitude to the user. Another advantage of the in-ear device described herein is that the external microphone is located within the housing of the in-ear device. Thus, the external microphone is located inside the ear canal, and at the entrance of the ear canal. Such location of the external microphone provides superior hear-through capability of the in-ear device and better spatialization of audio content since the external microphone placement within the ear canal itself will not occlude audio content information in the local area around the user. This is in contrast to other devices where the external microphone, if present, is placed outside of the ear canal, and such outside placement of the external microphone will limit the hear-through capability of the in-ear device through occlusion.

Disclosed herein is an in-ear device that is part of an audio system that provides audio content to a user. Embodiments of the present disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

FIG. 1 is a perspective view of a headset 100, in accordance with one or more embodiments. In some embodiments, the headset 100 presents media to a user, i.e., a user of the headset 100. Examples of media presented by the headset 100 include one or more images, video, audio, or some combination thereof. The headset 100 may include, among other components, a frame 105, a lens 110, a sensor device 115, and an audio system. The audio system provides audio content to a user of the headset using bone conduction technology and/or cartilage conduction technology. In alternative configurations, different and/or additional components may be included in the headset 100. Additionally, functionality described in conjunction with one or more of the components shown in FIG. 1 may be distributed among the components in a different manner than described in conjunction with FIG. 1 in some embodiments.

The headset 100 may correct or enhance the vision of a user, protect the eye of the user, or provide images to the user. The headset 100 may be eyeglasses which correct for defects in the user's eyesight. The headset 100 may be sunglasses which protect the user's eye from the sun. The headset 100 may be safety glasses which protect the user's eye from impact. The headset 100 may be a night vision device or infrared goggles to enhance the user's vision at night. The headset 100 may be a NED or HMD that produces artificial reality content for the user. Alternatively, the headset 100 may not include a lens 110 and may be a frame 105 with an audio system that provides audio (e.g., music, radio, podcasts) to the user.

The frame 105 includes a front part that holds the lens 110 and end pieces to attach to a head of the user. The front part of the frame 105 bridges the top of a nose of the user. The end pieces (e.g., temples) are portions of the frame 105 to which the temples of the user are attached. The length of the end piece may be adjustable (e.g., adjustable temple length) to fit different users. The end piece may also include a portion that curls behind the ear of the user (e.g., temple tip, ear piece).

The lens 110 provides or transmits light to the user of the headset 100. The lens 110 is held by a front part of the frame 105 of the headset 100. The lens 110 may be prescription lens (e.g., single vision, bifocal and trifocal, or progressive) to help correct for defects in the user's eyesight. The prescription lens transmits ambient light to the user of the headset 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display.

The sensor device 115 estimates a current position of the headset 100 relative to an initial position of the headset 100. The sensor device 115 may be located on a portion of the frame 105 of the headset 100. The sensor device 115 includes a position sensor and an inertial measurement unit.

The audio system of the headset 100 provides audio content to the user of the headset via the in-ear devices 130 for either or both ears of the user. In some embodiments, the audio system may receive information about the acoustic pressure within the ear canal or in a local area around the ear through the in-ear device. This information may be used by the audio system to send updated audio content to the in-ear devices 130 via the controller 140.

The in-ear devices 130 generate acoustic pressure waves, and thereby provide audio to the user in accordance with vibration instructions received from the controller 140. The in-ear devices 130 provide audio content as received from the audio system as well as enable hear-through functionality for the user. In some embodiments, the in-ear devices 130 may communicate with an audio system that is located on a device that is not a headset, but alternatively, may be a music player, smart watch, a cell phone, a laptop, or any other device that the in-ear devices 130 may couple to through a network, such as described with respect to FIG. 7.

The in-ear devices 130 may include one or more transducers, internal and external microphones, and other electronics, including a power supply, a receiver or a transceiver, and an in-ear device controller.

The in-ear device 130 described herein may comprise one in-ear device in one ear of the user or two in-ear devices, one in each ear of the user, as illustrated in FIG. 1. The in-ear device 130 may be cylindrical, spherical, or any other shape solid object that can be inserted into an ear of the user. Some embodiments of the in-ear device 130 may involve an over-molded housing or cover that entirely encapsulates the transducer, and the internal and external microphones. Some embodiments of the in-ear device 130 may be configured to have an internal shell including an internal microphone, an external shell including an external microphone, and a transducer. Some embodiments of the in-ear device 130 may be configured such that a portion of the body of the device is canted with respect to another portion of the body of the device. In some embodiments, the internal microphone or the external microphone, or both the internal and the external microphones may be located on the central axis of the portion of the body where they are situated, while in embodiments, they may be located offset to the central axis of the portion of the body where they are situated. In some embodiments, the in-ear device 130 may have a mesh covering on one end of the device, where the mesh covering acts as a port for the device. In some embodiments, the in-ear device 130 is configured to be located entirely inside the ear canal of the user. In some embodiments, a small portion of the in-ear device 130 may sit (or extend) outside the ear canal, however a majority portion of the in-ear device is configured to be located within the ear canal. Additional details regarding various embodiments of the in-ear device 130 can be found in the detailed description of FIGS. 2-6.

The controller 140 receives audio content to be provided to a user of the headset 100 and provides instructions to a transducer assembly that is located in the in-ear device, according to one embodiment. The controller 140 is embedded into the frame 105 of the headset 100. In other embodiments, the controller 140 may be located in a different location. The controller 140 may receive audio content (e.g., music, tuning signal) from a console for presentation to a user and generate vibration instructions based on the received audio content. The controller 140 may instruct the transducer in the in-ear device 130 regarding producing vibrations that generate acoustic pressure waves corresponding to the audio content to be provided to the user. For example, the instructions may include a content signal (e.g., a target waveform based on the audio content to be provided), a control signal (e.g., to enable or disable the transducer assembly), and a gain signal (e.g., to scale the content signal by increasing or decreasing an amplitude of the target waveform). The controller 140 may also receive sensor data from an accelerometer (not shown) and/or airborne acoustic pressure information from one or more microphones located in the in-ear device 130. The controller 140 may use the received data as feedback to compare the produced sound to a target sound (i.e., audio content) and adjust the vibration instructions to the transducer in the in-ear device 130 to make the produced sound closer to the target sound and thereby adaptively tune the transducer. The controller 140 may also use the received data regarding airborne acoustic pressure information in a local area around an ear for the user to provide vibration instructions to the transducer in the in-ear device 130 for enabling hear-through functionality for the user. Additional details regarding the controller 140 and the controller 140 operations with other components of the audio system are provided in conjunction with FIG. 7.

Figure 2:
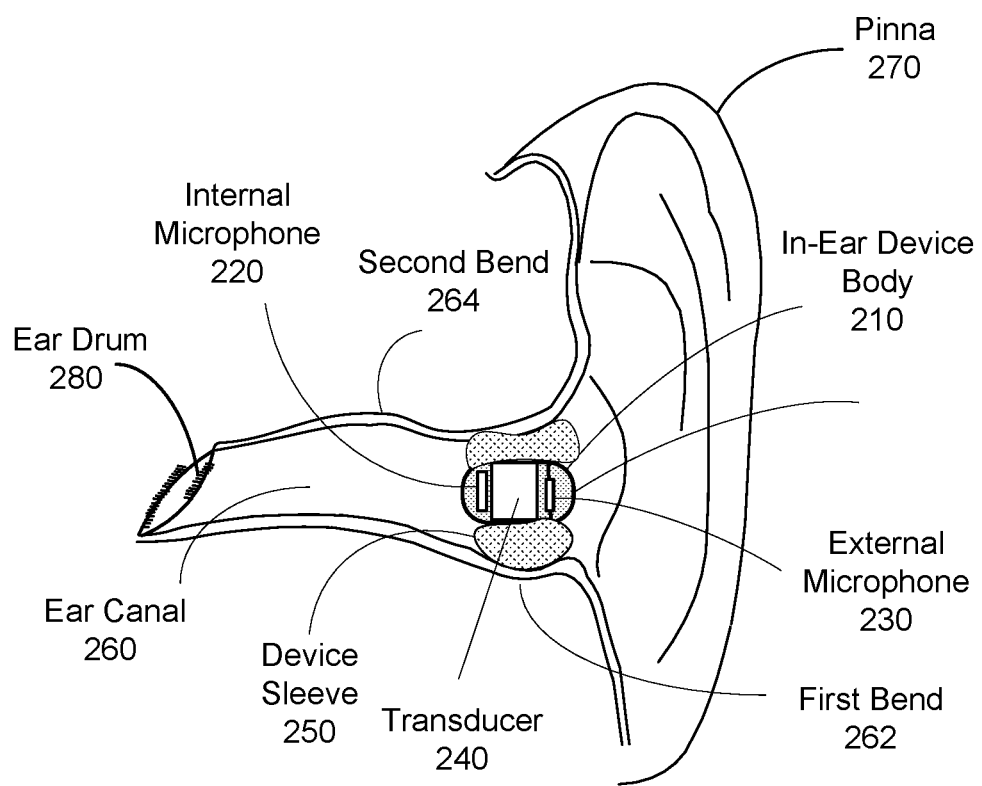
FIG. 2 is a profile view of an in-ear device, in accordance with one or more embodiments.

FIG. 2 is a profile view 200 of an in-ear device 210 to be used in conjunction with an audio system, in accordance with one or more embodiments. The in-ear device 210 is used to provide the user with audio content. Note that the in-ear device 210 depicted herein is for the left ear of the user. However, an identical in-ear device may be used for the right ear of the user as well. The in-ear device 210 may be an embodiment of the in-ear device 130 in FIG. 1.

Embodiments of the in-ear device 210 include a fully integrated device with an internal microphone 220, an external microphone 230, and a transducer 240 where a portion of the transducer 240 is part of a portion of the body of the device 210. In alternative configurations, different and/or additional components may be included in the in-ear device 210, such as a power supply, a receiver or a transceiver, and an in-ear device controller. In some embodiments, the in-ear device 210 may be located within a device sleeve 250. Additionally, in some embodiments, the functionality described in conjunction with one or more of the components shown in FIG. 2 may be distributed among the components in a different manner than described in conjunction with FIG. 2.

The in-ear device 210 is configured to be located entirely within an ear canal 260 of the user. The in-ear device 210 is placed within the ear canal 260 such that its placement may occlude a portion of the ear canal 260 either entirely, as depicted in FIG. 2, or it may occlude the portion partially. In some embodiments, the in-ear device 210 is located in the ear canal 260 such that it is positioned at the first bend 262 or between the first bend 262 and the second bend 264, or at the second bend of the ear canal 260. The in-ear device 210 is configured to be located in the ear canal 260 so that one side of the in-ear device, i.e., the external side, faces the outward ear portion, i.e., towards the pinna 270, while the other end of the in-ear device 210, i.e., the internal side, faces the inner ear portion, i.e., towards the ear drum 280. Thus, the in-ear device 210 is located in the ear canal 260 so that the internal side of the in-ear device 210 is closer to the ear drum 280 than the external side of the in-ear device 210. In some embodiments, the in-ear device 210 may have a pre-shaped body that is based on deep scan ear canal geometry data derived from a population of users to ensure better fit for users.

The internal microphone 220 detects airborne acoustic pressure waves in the ear canal. The internal microphone 220 may be located within the in-ear device 210 inside the same housing 215 as the transducer 240 and the external microphone 230. The internal microphone 220 is located near the internal side of the in-ear device 210 such that it faces the inner ear portion, towards the ear drum 280. The internal microphone 220 detects airborne acoustic pressure waves through either a dedicated or a shared internal port that is located on the body of the in-ear device that faces the ear drum. In some embodiments, the airborne acoustic pressure waves detected by the internal microphone 220 is converted into electrical signals and then provided to the audio system to be subsequently used for audio feedback and tuning when providing audio content to the user. In some embodiments, the tuning functionalities may be designed to provide customized audio to the user. Thus, in embodiments of the in-ear device 210 with the internal microphone 230, the sensed acoustic pressure frequency response from the ear canal may be provided to the audio system, where they may be used to generate and send further vibration instructions to the transducer 240 to generate a corrective acoustic pressure frequency response in view of a target acoustic pressure frequency response in order to tune the frequency response of the audio system.

In embodiments described herein, the internal microphone 220 uses micro-electro-mechanical system (MEMs) technology, and may be any of: a binaural microphone, a vibration sensor, a piezoelectric accelerometer, a capacitive accelerometer, or some combination thereof.

In some embodiments, the in-ear device 210 includes an external microphone 230 to detect airborne acoustic pressure waves in the outer ear portion. The external microphone 230 is located within the in-ear device 210 inside the same housing 215 as the transducer and the internal microphone 220. The external microphone 230 is located near the external side of the in-ear device 210 device such that it faces the outer ear portion (i.e., the pinna 270) of the user. In some embodiments, the airborne acoustic pressure waves detected by the external microphone 230 is converted into electrical signals and then provided to the audio system to be subsequently used for tuning purposes when providing audio content to the user and/or for hear-through purposes. In some embodiments with the external microphone 230, the sensed acoustic pressure waves from the outer ear near the pinna 270 may be provided to the audio system which may generate and further vibration instructions to the transducer 240 for providing hear-through acoustic functionality. Hear-through functionality may be important when the headset is in use in environments that require situational awareness of the local environment. Since the in-ear device 210 may occlude the ear canal 260 and prevent external environmental acoustic content from being heard by the user, acoustic signals sensed by external microphone 240 may be provided as vibration instructions to the transducer 240 to provide the external environmental acoustic content to the user.

In embodiments described herein, the external microphone 230 uses micro-electro-mechanical system (MEMs) technology, and may be any of: a binaural microphone, a vibration sensor, a piezoelectric accelerometer, a capacitive accelerometer, or some combination thereof.

The in-ear device 210 includes a transducer 240 that converts vibration instructions received from an audio system into acoustic pressure vibrations in the ear canal 260, thereby providing audio content to the user. In some embodiments, the transducer 240 includes a diaphragm and a driver assembly. In these embodiments, the driver assembly is configured to vibrate the diaphragm based on vibration instructions received from the audio system and generate audio content. The transducer 240 is an integral part of the body of the in-ear device 210, such that portions of the driver assembly are coupled to an inner wall of the body of the in-ear device 210. Thus, in contrast to other in-ear devices where the transducer is a stand-alone component within a dedicated housing that may be connected to other components such as microphones, in the embodiments presented herein, the transducer 240 is miniaturized because the a portion of the body of the device 210 is a portion of a structural component of the transducer 240, i.e., is a portion of the driver assembly of the transducer 240. The driver assembly may include a voice coil that is suspended between the poles of a magnet. In other embodiments, transducer 240 may be a transducer section that includes a frame and piezoelectric actuators that are coupled to the frame. In these embodiments, the piezoelectric actuators are configured to generate an acoustic pressure wave and produce the audio content. One end of the transducer section may be coupled to a first volume section to form a front cavity with an aperture from which the generated acoustic pressure wave exits the front volume section as audio content towards an ear drum of a user. In some embodiments, the in-ear device 200 may have a dedicated internal port to output the audio content to the ear canal, while in other embodiments, a shared internal port may be used to output audio content from the transducer 240 as well as to receive acoustic pressure information at the internal microphone 220.

The size and geometry of the transducer 240 defines the positioning of the in-ear device 210 within the ear canal 260 of the user. In embodiments described herein, based on the target size and acoustic performances such as desired loudness, frequency bandwidth, total harmonic distortion, etc., the driver used in the transducer 240 is an ultra-small dynamic driver with a diameter that is less than a predefined threshold diameter of 4 mm. The target sound pressure level (SPL) output of the embodiments of the in-ear device 210 described herein is greater than a predefined threshold of 100 decibels in a frequency bandwidth range of 20 Hz to 20 kHz with a total harmonic distortion (THD) of less than 10% at a maximum power input of at least 10 mW. Furthermore, in embodiments of the in-ear device 210 described herein, the driver may be integrated with an internal piece (i.e., an internal nozzle and the internal microphone) and an external piece (i.e., an extra external volume and the external microphone).

In some embodiments, the in-ear device 210 may be located inside a device sleeve 250, while in other embodiments, the in-ear device 210 may be configured to be directly located within the ear-canal 260 of the user without being first inserted into a device sleeve 250. The device sleeve 250 may be built out of foam or compliant or rigid silicone materials or acrylic materials. In some embodiments, the device sleeve 250 may be a gel-filled comfort sleeve that is designed to produce even pressure against the ear canal 260. In some embodiments, the device sleeve 250 may be a pre-shaped sleeve that is based on deep scan ear canal geometry data derived from a population of users. The separate device sleeve 250 may assist in more comfortable insertion and situation of the in-ear device 210 in the ear canal 260 of the user.

Figure 3:
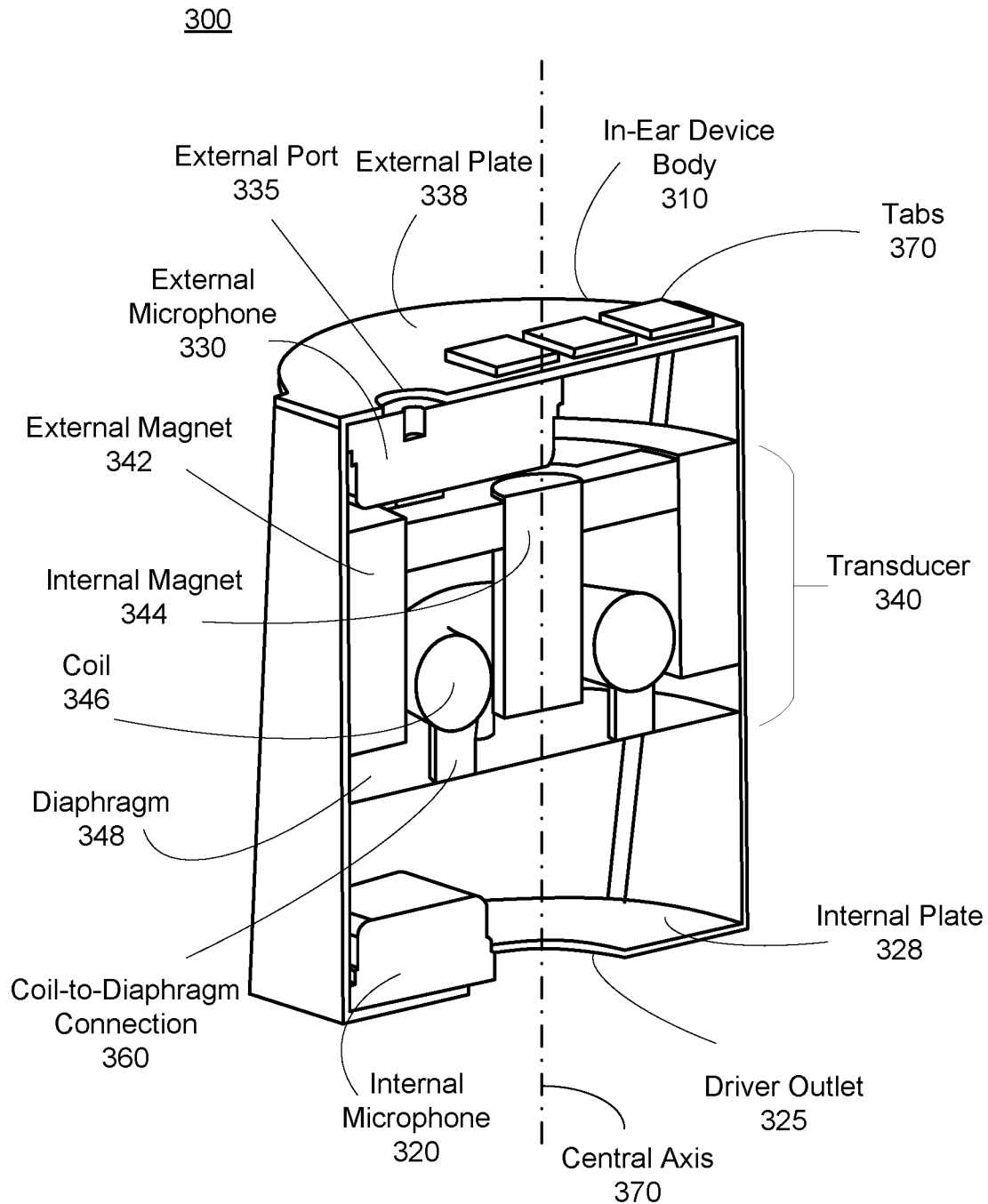
FIG. 3 is a perspective internal view of an integrated in-ear device, in accordance with one or more embodiments.

FIG. 3 is a perspective internal view of an integrated in-ear device 300, in accordance with one or more embodiments. The in-ear device 300 depicted in FIG. 3 is an embodiment of the in-ear device 130 depicted in FIG. 1. The in-ear device 300 may include, among other components, an in-ear device body 310 that includes within it, an internal microphone 320, an external microphone 330, and a transducer 340. In alternative configurations, different and/or additional components may be included in the body of the in-ear device 300, such as a power supply, a receiver or a transceiver, and an in-ear device controller. Additionally, in some embodiments, the functionality described in conjunction with one or more of the components shown in FIG. 3 may be distributed among the components in a different manner than described in conjunction with FIG. 3.

In embodiments described herein, the in-ear device body 310 is configured to have a small form factor to fit entirely within the ear canal of a user. The in-ear device body 310 includes the internal microphone 320 and the external microphone 330. Furthermore, the in-ear device body 310 is configured such that a portion of the body 310 is a part of a portion of the transducer 340. In the depicted embodiment in FIG. 3, the two opposite ends of the in-ear device body 310 are formed from an internal plate 328 and and an external plate 338, respectively. Embodiments may have various shapes for the body 310 as well as the plates. In some embodiments, the central axes of the microphones (not shown) and the central axis 370 of the in-ear device body 310 may coincide. In some embodiments, the central axes of the microphones and the central axis 370 may be parallel, but not coincide. In other embodiments, the central axis 370 may make a non-zero angle (e.g., 90 degrees) with the central axes of the microphones. In some embodiments, the in-ear device body 310 may be made from metal and/or plastic housing. The housing may be on the order of 0.2 mm thickness.

The internal microphone 320 is an embodiment of the internal microphone 220 in FIG. 2. The internal microphone 320 is configured to detect any received sound within the ear canal from one or more internal ports that are located on the in-ear device body 310. In some embodiments, the internal microphone 320 may detect sound that is received at a dedicated internal port (not shown). In other embodiments, the internal microphone 320 may detect sound that is received at an internal port that is shared with the transducer 340, such as the depicted driver outlet 325. In some embodiments, the dedicated internal port or the shared internal port may be located on an internal plate 328 that forms one end, i.e., the internal end, of the in-ear device body 310. In some embodiments, the internal microphone 320 may located on the inner wall of the internal plate 328. In some embodiments, the internal microphone 320 may be located offset from a central axis 370 of the enclosure 350, while in other embodiments, the internal microphone 320 may be located along the central axis of the enclosure 350.

The external microphone 330 is an embodiment of the internal microphone 230 in FIG. 2. The external microphone 330 is configured to detect any received sound from a local area of the user from an external port 335 that is located on the in-ear device body 310. In some embodiments, the external port 335 may be located on an external plate 338 that forms one end, i.e., the external end, of the in-ear device body 310. In some embodiments, the external microphone 330 may located on the inner wall of the external plate 338. In some embodiments, the external microphone 330 and the external port 335 may be located offset from a central axis 370 of the enclosure 350, while in other embodiments, the external microphone 330 and the external port 335 may be located along the central axis of the enclosure 350.

The transducer 340 is an embodiment of the transducer 240 in FIG. 2. The transducer 340 converts vibration instructions received from an audio system into acoustic pressure vibrations, thereby providing audio content to the user. The transducer 340 is configured such that a portion of a structural component of the transducer 340 is a portion of the in-ear device body 310. In some embodiments, the transducer 340 may include a driver assembly with an external magnet 342, an internal magnet 344, and a coil 346 that is suspended between external magnet 342 and the internal magnet 344, and a diaphragm 348. The coil 346 may be connected to the diaphragm 348 through a coil-to-diaphragm connector 360. The external magnet 342 of the driver assembly may be coupled to an inner wall of the in-ear device body 310. In these embodiments, the driver assembly is configured to vibrate the diaphragm 348 based on vibration instructions received from the audio system and generate audio content. The generated audio content from the transducer 340 is provided to the ear canal of the user through the driver outlet 325.

In some embodiments, the external plate 338 of the in-ear device body 310 may have electrical connection pads 370 that may be used for providing additional connectivity to a power assembly (not shown) and an in-ear device controller (not shown) that may be located in the in-ear device 300.

Figure 4:
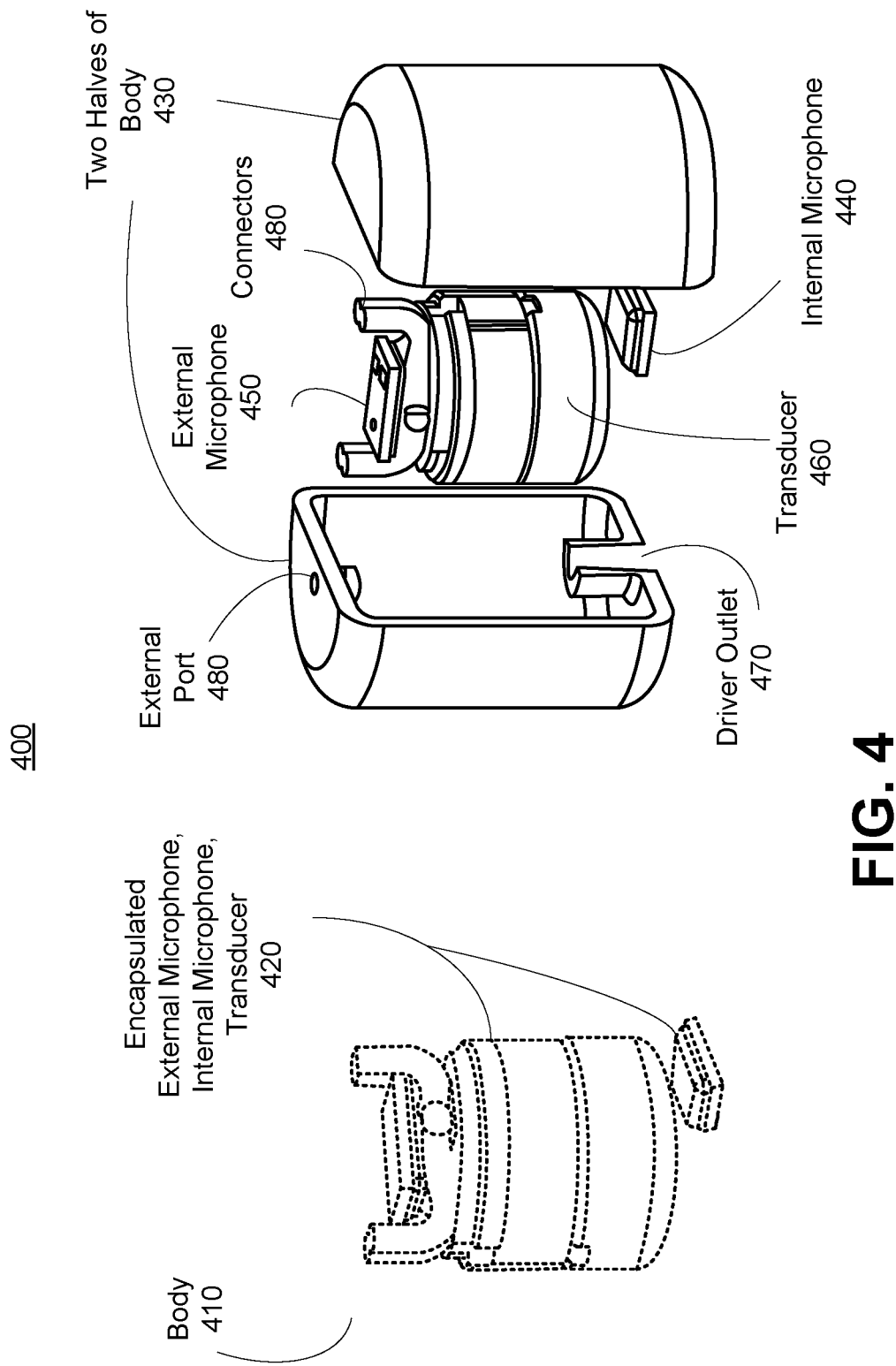
FIG. 4 depicts perspective views of an in-ear device body encapsulating microphones and a transducer, in accordance with one or embodiments.

FIG. 4 depicts an encapsulated and a split-open perspective view of an in-ear device 400 with an over-molded body 410, in accordance with one or embodiments. The in-ear device 400 is an embodiment of the in-ear device 130 of FIG. 1. The encapsulated view of the in-ear device 400 depicts an over-molded body 410 with an entirely encapsulated external microphone, internal microphone, and transducer 420. In alternative configurations, different and/or additional components may be included in the body of the in-ear device 400, such as a power supply, a receiver or a transceiver, and an in-ear device controller. Additionally, in some embodiments, the functionality described in conjunction with one or more of the components shown in FIG. 4 may be distributed among the components in a different manner than described in conjunction with FIG. 4.

The in-ear device 400 includes an over-molded body 410, in which the depicted two halves of the over-molded body 430 may include within them at least an internal microphone 440, an external microphone 450, a transducer 460 that provides audio content to the user of the device 400 through the driver outlet 470. In some embodiments, the over-molded body 410 has a first end and a second end that is opposite the first end. The first end is configured to face into the local area of the user at the entrance of the ear canal, while the second end is configured to face into the ear canal towards the ear-drum of the user. An external port 480 may be located on the first end of the body 410 and one or more internal ports (e.g., the driver outlet 470) may be located on the second end of the body 410.

In some embodiments, the encapsulated portion of the in-ear device 400 may have connectors 480 that may be used for providing additional connectivity to a power supply for the in-ear device 400 and to a controller unit that may be relaying vibration instructions from an audio system to the in-ear device 400.

Figure 5:
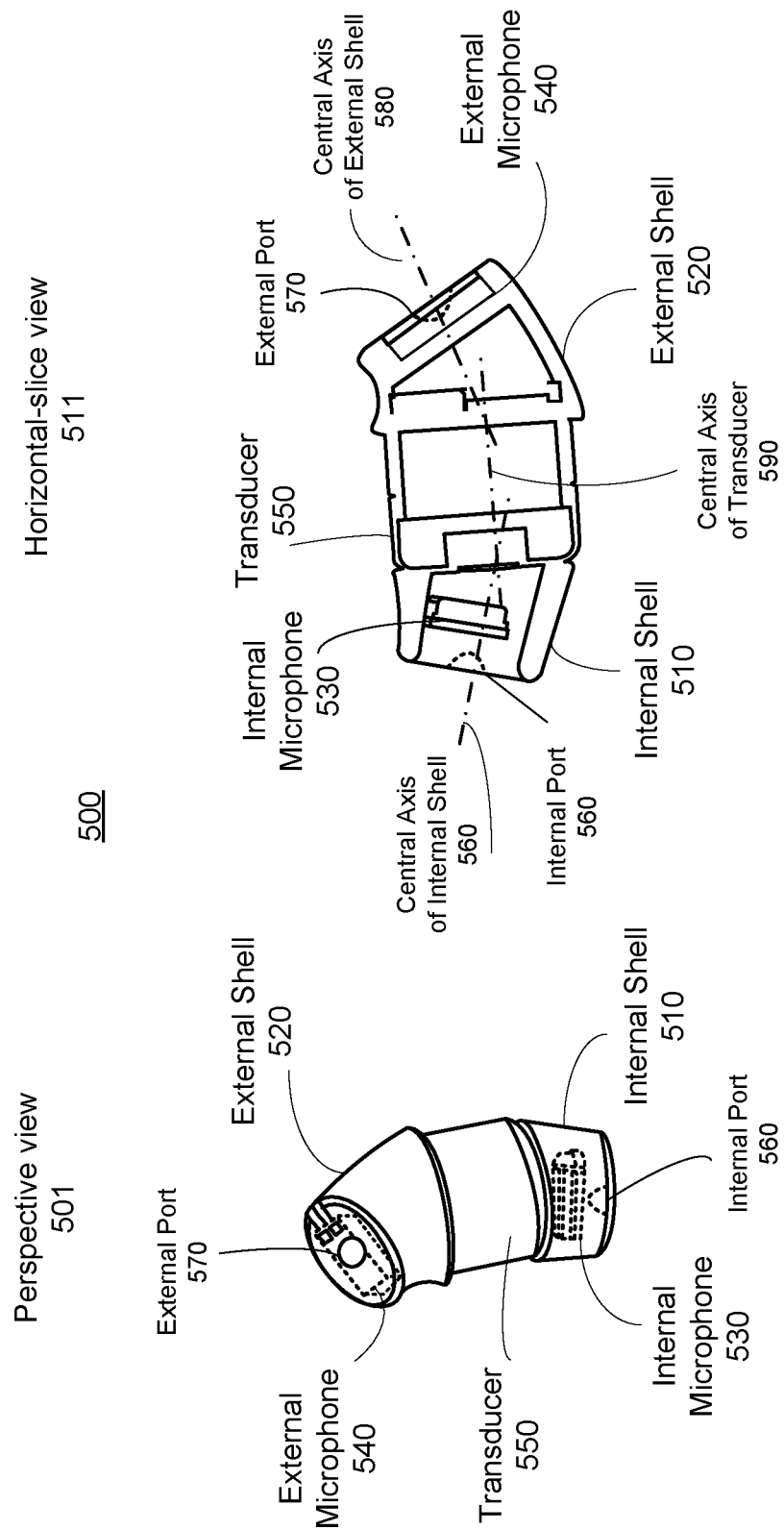
FIG. 5 depicts a perspective view and a horizontal-slice view of an in-ear device with an inner shell, a transducer, and an outer shell, in accordance with one or embodiments.

FIG. 5 depicts a perspective view 501 and a horizontal slice view 511 of an in-ear device 500, in accordance with one or embodiments. The in-ear device 500 is an embodiment of the in-ear device 130 of FIG. 1, with an internal shell 510, an external shell 520, and a transducer 550. In alternative configurations, different and/or additional components may be included in the body of the in-ear device 500, such as a power supply, a receiver or a transceiver, and an in-ear device controller. Additionally, in some embodiments, the functionality described in conjunction with one or more of the components shown in FIG. 5 may be distributed among the components in a different manner than described in conjunction with FIG. 5.

The horizontal-slice view 511 of the in-ear device 500 depicts horizontal slice views of the internal shell 510, the external shell 520, the internal microphone 530, the external microphone 540, and the transducer 550.

In embodiments of the in-ear device 500 depicted herein, the internal shell 510 may be located on one end of the transducer 550. The internal shell 510 may include the internal microphone 530 for sensing acoustic pressure information within the ear canal through an internal port 560. The internal microphone 530 may be located centered along a central axis 560 of the internal shell 510 or located offset from the central axis 560 of the internal shell 510. In some embodiments, the internal microphone 530 may be located coupled to an inner wall of the internal shell 510. In some embodiments, the internal shell 510 may be configured as an internal nozzle-like structure. In some embodiments, the internal shell 510 may be canted with respect to the transducer 550 so that the central axis 560 of the internal shell 510 does not coincide with a central axis 590 of the transducer 550, but makes a non-zero angle with the central axis 590 of the transducer 550.

In embodiments of the in-ear device 500 depicted herein, the external shell 520 may be located on a second end of the transducer 550. The external shell 520 may include the external microphone 540 for sensing acoustic pressure information in a local area around the user through an external port 570. In some embodiments, the external shell 520 may be configured to have greater volume than the volume of the internal shell 510 to help boost the bass audio performance of the in-ear device 500. The external microphone 540 may be located centered along a central axis 580 of the external shell 520 or located offset from the central axis 580 of the external shell 520. The external microphone 540 may be located coupled to an inner wall of the external shell 520. In some embodiments, the external shell 520 may be canted with respect to the transducer 550 so that the central axis 580 of the external shell 520 does not coincide with the central axis 590 of the transducer 550, but makes a non-zero angle with the central axis 590 of the transducer.

Advantages of the in-ear device described herein arise from a configuration in which a portion of the body of the device and transducer components together form the transducer, thereby leading to an ultra-small transducer. Such an ultra-small transducer facilitates miniaturization which in turn facilitates placement of the device within the ear canal. As noted above, the external shell 520 may also be configured to have greater volume than the volume of the internal shell 510 to help boost the bass audio performance of the in-ear device 500. The external shell 520 may also be partially vented to further boost the bass audio performance. The vents will be covered by resistive mesh, and such vents shall be placed as far away from the external microphone 540 as possible. Possible canting of either or both of the internal shell 510 and the external shell 520 with respect to the transducer 550 allows for offset positioning of the internal and external microphones with respect to the transducer, and also may be configured to provide better fit with respect to the ear canal geometry of a user.

Figure 6A:
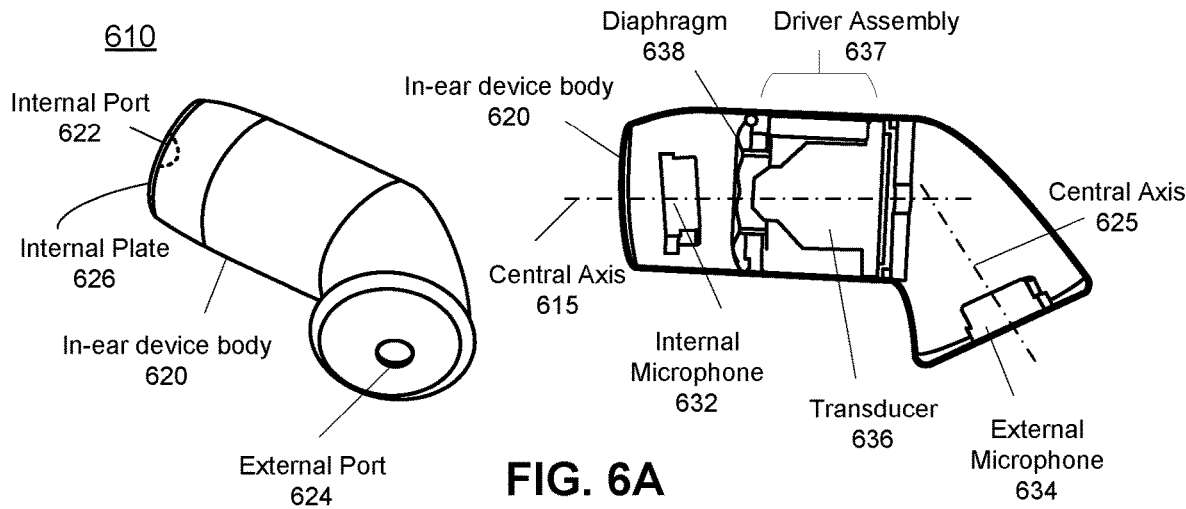
FIG. 6A depicts a parametric view and a horizontal-slice view of an in-ear device with a centered internal microphone, in accordance with one or embodiments.
Figure 6B:
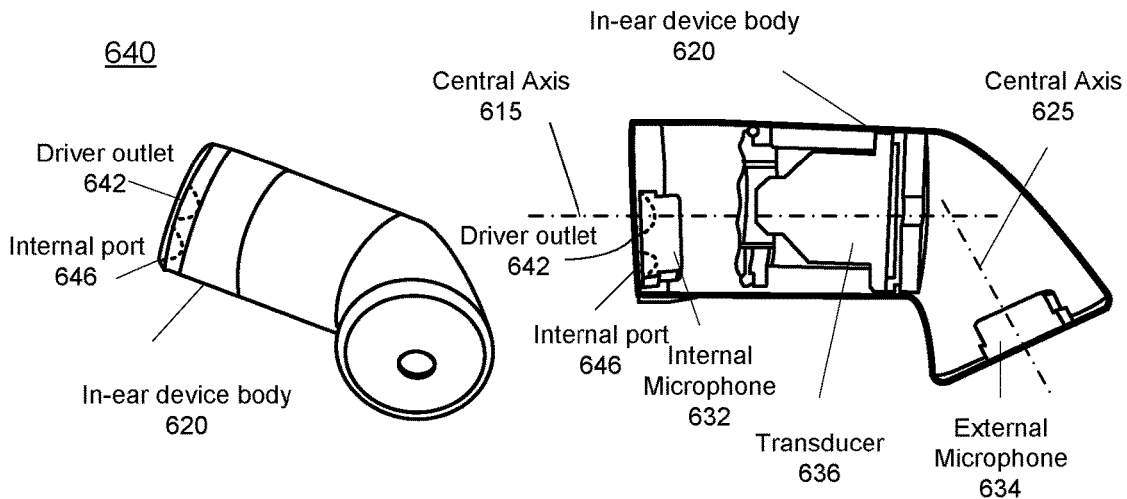
FIG. 6B is a parametric view and a horizontal-slice view of an in-ear device with an offset internal microphone, in accordance with one or embodiments.
Figure 6C:
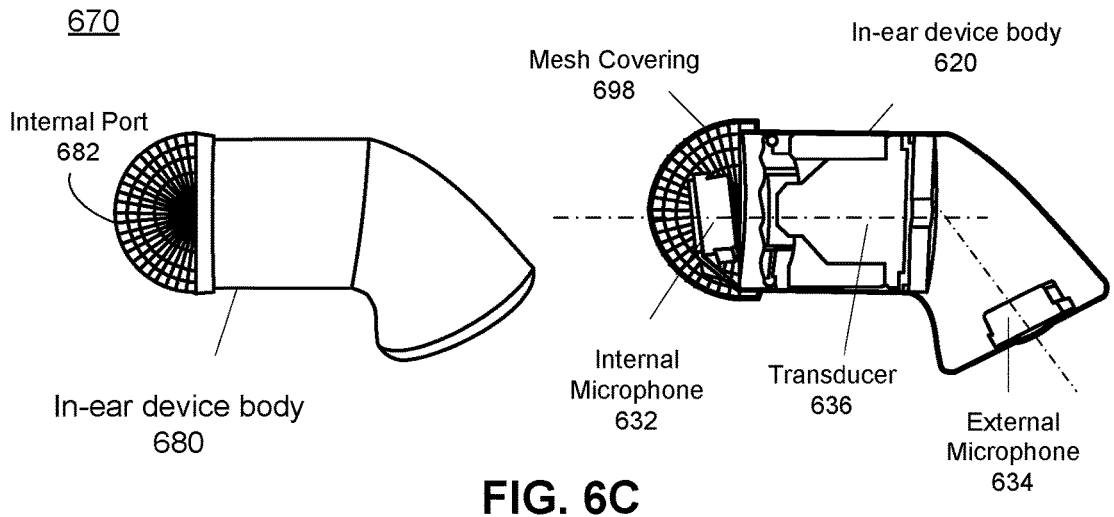
FIG. 6C is a parametric view and a horizontal slice view of an in-ear device with an internal mesh covering, in accordance with one or embodiments.

FIG. 6A-FIG. 6C depict parametric and horizontal-slice views of an in-ear device, in accordance with some embodiments.

The in-ear device 610 depicted in FIG. 6A may be an embodiment of the in-ear device 130 of FIG. 1. The in-ear device body 620 of the in-ear device 610 includes an internal microphone 632, an external microphone 634, and a transducer 636. In alternative configurations, different and/or additional components may be included in the body of the in-ear device 610, such as a power supply, a receiver or a transceiver, and an in-ear device controller. Additionally, in some embodiments, the functionality described in conjunction with one or more of the components shown in FIG. 6A may be distributed among the components in a different manner than described in conjunction with FIG. 6A.

The in-ear device body 620 includes the internal microphone 632, the external microphone 634, and the transducer 636. The device body 620 is configured such it includes the internal microphone 632 and the external microphone 634. Furthermore, the device body 620 is additionally configured so that a portion of the body of the body 620 is a portion of a structural component of the transducer 636 itself. Thus, the transducer is composed of a driver assembly 637 and a diaphragm, where portions of the driver assembly 637 are coupled to a portion of the device body 620. The driver assembly 637 may include magnets that are embodiments of magnets 342 and 344 in FIG. 3, and a coil that is an embodiment of coil 346 in FIG. 3. The diaphragm 638 may be an embodiment of the diaphragm 348 in FIG. 3. The external port 624 may be an embodiment of the external port 335 depicted in FIG. 3. Similarly, the internal port 622 may be an embodiment of the driver outlet 325 depicted in FIG. 3. The internal port 622 may be located on an internal plate 626 that may be an embodiment of the internal plate 328 in FIG. 3. The internal microphone 632 may be centered with respect to the central axis 615 of the portion of the in-ear device body 630 where it is located. This centered configuration of the internal microphone 632 ensures that any outer portions of the in-ear device body 630 do not get pushed out, and results in a reduction in size in the radial directions of the in-ear device 610.

As FIG. 6A depicts, in some embodiments, the in-ear device body 620 may be configured such that one or more portions of the body 620 is canted with respect to the remainder portions of the body 620. Thus, the central axis 615 of an internal ear canal facing portion of the in-ear device body makes a non-zero angle with the central axis 625 of an external ear canal facing portion of the in-ear device body. Such canting of a portion of the device body with respect to another portion of the device body may allow for offset positioning of a microphone, and also may be configured to provide better fit with respect to the ear canal geometry of a user.

FIG. 6B depicts a parametric view and a horizontal slice view of an in-ear device 640, in accordance with one or embodiments. The in-ear device 640 may be an embodiment of the in-ear device 130 of FIG. 1, and is substantially similar to the in-ear device 610 depicted in FIG. 6A.

However, the in-ear device 640 differs from in-ear device 610 in that the internal microphone 632 may be offset with respect to the central axis 615 of the portion of the in-ear device body 620 where it is located. This offset configuration of the internal microphone 632 re-positions the internal microphone 632 away from the direction for presenting audio content to the user through the driver outlet 642, and therefore may result in superior sound production than the centered internal microphone location depicted in FIG. 6A. In some embodiments, the internal microphone 632 may obtain information regarding the acoustic pressure in the ear canal through the driver outlet 642, while in other embodiments, there may be a separate internal port 646 that may be used by the internal microphone 632 for this purpose. In this configuration, the internal microphone 632 may be coupled to an inner wall of an internal plate of the in-ear device body 620.

FIG. 6C depicts a parametric view and a horizontal slice view of an in-ear device 670, in accordance with one or embodiments. The in-ear device 670 may be an embodiment of the in-ear device 130 of FIG. 1 and is substantially similar to the in-ear device 610 depicted in FIG. 6A. However, the in-ear device 670 differs from in-ear device 610 in that the internal plate 626 is replaced with a mesh covering 698. In some embodiments, the mesh covering 698 may be configured as a mesh dome. The mesh covering 698 is configured to be an acoustically transparent covering, such that the mesh covering 698 is one of the internal ports 682 of the in-ear device 670. The internal microphone 632 is configured to be located inside the mesh covering 698, and is configured to be supported by structural components that may form part of the body of the device, where the structural components supporting the internal microphone 632 are also covered by the mesh covering. The advantage of the metal mesh covering is that it can provide the acoustic resistance, the protection to dusts and ear wax, and the structure rigidity all at the same time. It may be made of woven thin stainless steel alloys fibers.

Figure 7:
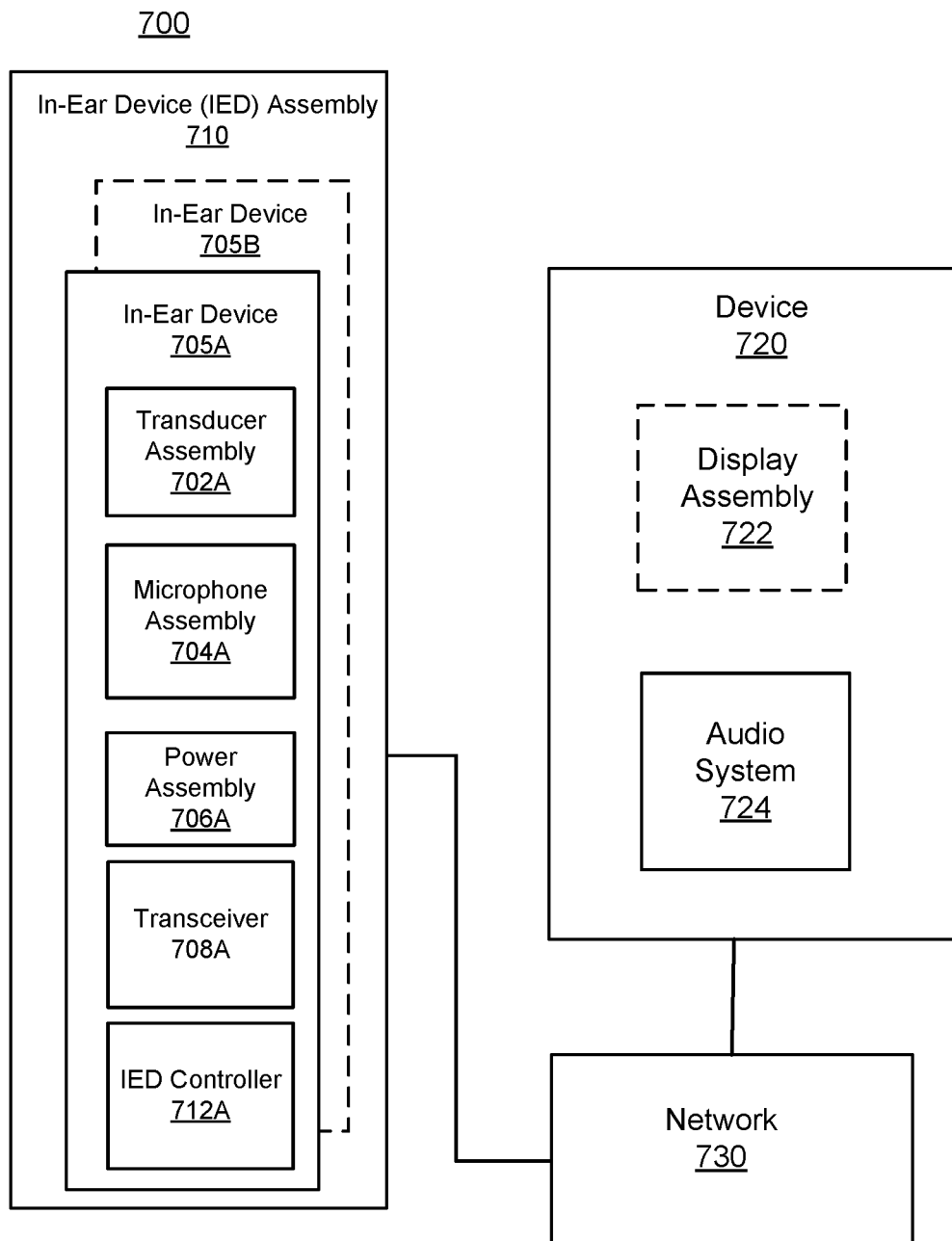
FIG. 7 is an example system diagram including an in-ear device assembly, in accordance with one or more embodiments.

FIG. 7 is a depiction of an example system 700 including an in-ear device assembly 710, in accordance with one or more embodiments. In the example shown in FIG. 7, the system includes an in-ear device assembly 710, a device 720, and a network 730. While FIG. 7 shows an example system 700 including one in-ear device assembly 710 and one network 730, in other embodiments, any number of these components may be included in the system 700. For example, there may be multiple in-ear device assemblies 710, each having an associated network 730 with each in-ear device assembly 710 and network 730 communicating with the user device 720. In alternative configurations, different and/or additional components may be included in the system 700. The in-ear device 130 of FIG. 1 is an embodiment of the in-ear device assembly 710. Additionally, functionality described in conjunction with one or more of the components shown in FIG. 7 may be distributed among the components in a different manner than described in conjunction with FIG. 7 in some embodiments.

The in-ear device (IED) assembly 710 includes one or more in-ear devices 705A, 705B, etc. Each in-ear device 705 includes a transducer assembly 702, a microphone assembly 704, a power assembly 706, a transceiver 708, and an IED controller 712. Thus, FIG. 7 depicts in-ear device 705A which includes a transducer assembly 702A, a microphone assembly 704A, a power assembly 706A, a transceiver 708A, and an IED controller 712A. Similarly, another in-ear device 705B in the IED assembly 710 can include a corresponding transducer assembly, microphone assembly, power supply, transceiver, and an IED controller. In some embodiments, the IED assembly 710 may include shared internal and external ports for the in-ear devices 705. In some embodiments, each in-ear device 705 in the IED assembly 710 may have its own set of internal and external ports. In some embodiments, some of the in-ear devices 705 will share internal and external ports, while some of the in-ear devices 705 will have dedicated ports.

Embodiments of the transducer assembly 702 convert vibration instructions received from the IED controller 712 into acoustic pressure vibrations, thereby providing audio content to the user. The transducer assembly 702 is configured such that a portion of a structural component of the transducer assembly 702 is a portion of the body of the in-ear device 705. In some embodiments, the transducer assembly 702 may include a driver assembly and a diaphragm. In these embodiments, the driver assembly is configured to vibrate the diaphragm based on the vibration instructions received from the IED controller 712 and generate audio content. The generated audio content from the transducer assembly 702 is provided to the ear canal of the user through an internal port.

Embodiments of the microphone assembly 704 may include one or more internal microphones, and one or more external microphones. The one or more internal microphones detect acoustic pressure within the ear canal from one or more internal ports and provide this information to the IED controller 712. The one or more external microphones detect acoustic pressure near the local area of the user from one or more external ports and provide this information to the IED controller 712.

The power assembly 706 provides power to the in-ear device 712 which is used to activate the transducer assembly 702, the microphone assembly 704, the transceiver 708, and the IED controller 712. In some embodiments, the power assembly 706 may be part of a single power assembly in the IED assembly that provides power to all the IEDs 704. In some embodiments, the power assembly 706 may be a battery. In some embodiments, the battery may be a rechargeable battery.

Embodiments of the transceiver 708 may include an integrated transmitter and receiver that facilitates communication between the device 720 and the in-ear device 705 through the network 730. The transceiver 708 may transfer signal information through wireless or wired technologies, including radio frequency (RF), BLUETOOTH, WIFI, among others.

The IED controller 712 provides instructions to the transducer assembly 702 in the in-ear device 705 to produce sound. While FIG. 7 depicts a dedicated IED controller 712A that provides the instructions to transducer assembly 702A, some embodiments may have a single IED controller 712 located on one in-ear device (e.g., 705A) that provides instructions to the transducer assemblies 702 across all the in-ear devices (e.g., 705B) in the IED assembly 710. In other embodiments, some in-ear devices 705 in the IED assembly 710 may have the functionality of the IED controller 712 shared between them. In other embodiments, each in-ear device has a dedicated IED controller 712. In some embodiments, the IED controller 712 may have some or all of the functionality of the controller 140 described in FIG. 1. In some embodiments, the IED controller 712 receives audio content and/or instructions from the device 720 via the network 730 and generates vibration instructions for the transducer assembly 702 based on the audio content and/or instructions. In other embodiments, the IED controller 712 receives vibration instructions via the network 730 generated from the audio system 724 of the device 720 and provides the received transducer instructions to the transducer assembly 702 in the in-ear device 705 to produce sound. The vibration instructions may include a content signal (e.g., electrical signal applied to the transducer to produce sound), a control signal to enable or disable the in-ear device 705, and a gain signal to scale the content signal (e.g., increase or decrease the sound produced by the transducer assembly 702). The TED controller 712 may also receive microphone instructions via the network 730, and the IED controller 712 may provide the microphone instructions to the microphone assembly 704 in the in-ear device 705 to adjust for a gain based on feedback data received from the in-ear device 705.

Advantages of the in-ear device assembly 710 arise from configurations in which a portion of the body of the in-ear device 705 and transducer components together form the transducer assembly 702, leading to an ultra-small size of the transducer assembly 702. The ultra-small transducer size also facilitates placement of the in-ear device assembly 710 within an ear canal of a user with a better fit for a majority of users. Furthermore, such placement enables the small-size transducer to provide a target level of loudness for the user. This is in contrast to other in-ear devices where the transducer is placed outside of the ear canal. Such outside placement of the transducer in the other devices requires that the transducer be large enough to provide a target level of loudness to the user, which in turn would introduce occlusion to the sound received at the ear canal entrance. Another advantage of the in-ear device assembly 710 is since the external microphone is located inside the ear canal, the disclosed embodiments provide superior hear-through capability in contrast to other devices where the external microphone, if present, is placed outside of the ear canal.

The device 720 includes an audio system 724. The device 720 can be a music player, a smart watch, a cell phone, a laptop, a headset (e.g., head mounted display, near-eye display, eyeglasses), any personal device of the user, or any other device that a user can couple to through the network 730. In some embodiments, the device 720 may additionally include a display assembly 722. When the device 720 is an artificial reality headset, the system may operate in a VR, AR, or MR environment, or some combination thereof. The artificial headset may present content to a user comprising augmented views of a physical, real-world environment with computer-generated elements (e.g., two dimensional (2D) or three dimensional (3D) images, 2D or 3D video, sound, etc.).

The display assembly 722 is configured to display information to the user. In various embodiments, the display assembly 722 is an electronic display. The electronic display may be a single electronic display or multiple electronic displays (e.g., for a head-mounted display, a display for each eye of a user). Examples of the electronic display include: a liquid crystal display (LCD), an organic light emitting diode (OLED) display, an active-matrix organic light-emitting diode display (AMOLED), some other display, or some combination thereof. In some embodiments, the display assembly 722 is optional.

The audio system 724 is configured to provide audio content to the user. The device 720 may provide the audio content to the user by sending the audio content to an in-ear device 710 via the network 730. The audio system 724 may provide instructions for the in-ear device 712 to increase or decrease a volume for the audio content. The audio system 724 may provide instructions for the in-ear device 712 to adjust for a gain in the microphones within the device 712 based on feedback data received from the in-ear device 712. The audio system 724 may adjust an audio signal based on information received from a microphone in the ear canal of the user to make it match a target waveform, and/or from information received from an external microphone to provide for noise cancellation.

The network 730 connects the in-ear device assembly 710 to the device 720. The network 730 may include any combination of local area and/or wide area networks using both wireless and/or wired communication systems. In one embodiment, the network 730 uses standard communications technologies and/or protocols. The network 730 may allow wireless transmission of signals via Radio Frequency (RF), BLUETOOTH, WIFI, some other communication methodology, or some combination thereof.

System Environment

Figure 8:
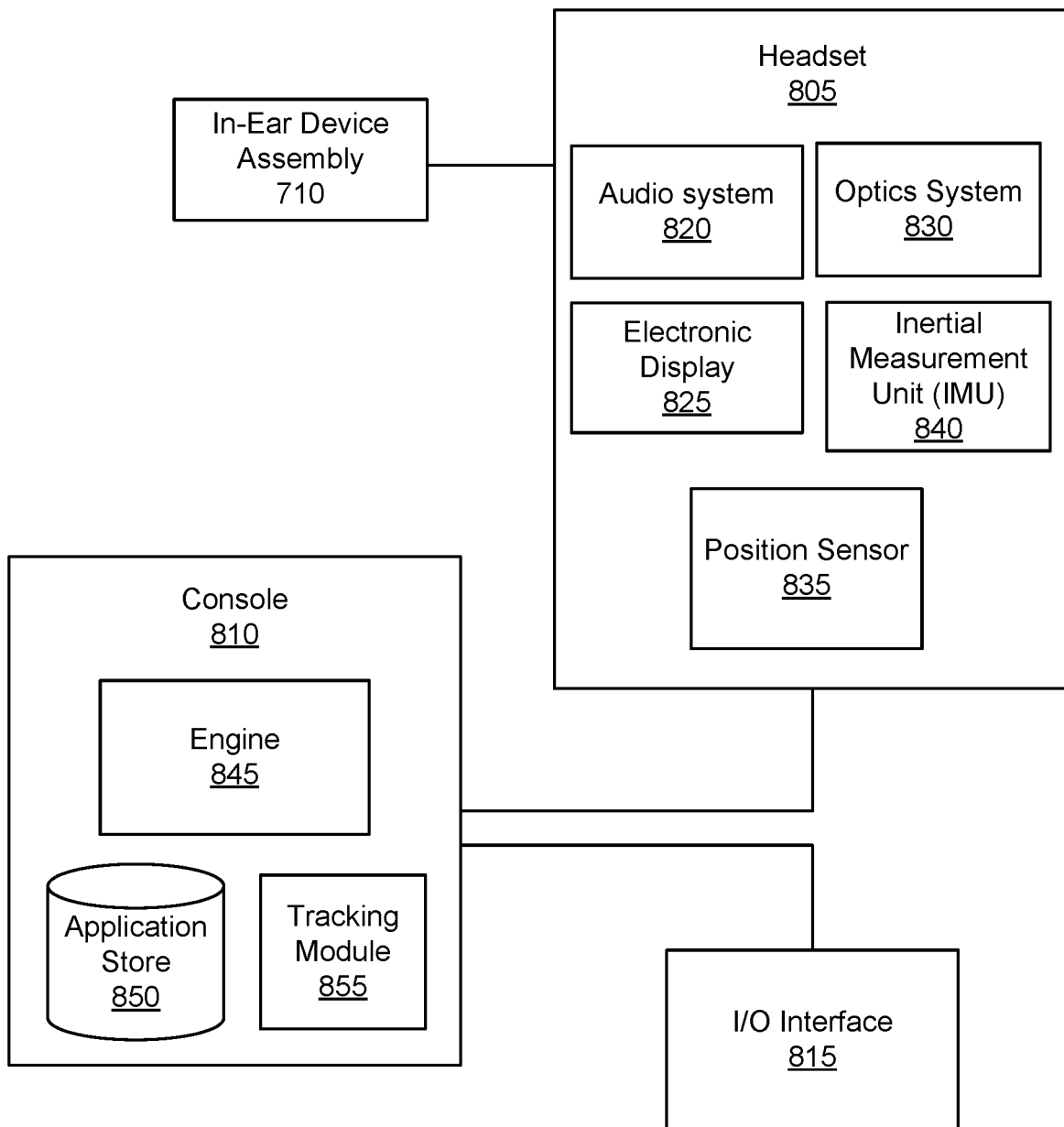
FIG. 8 is a block diagram of a system environment that includes a headset with an audio system, a console, and an in-ear plug, in accordance with one or more embodiments.

FIG. 8 is a system environment 800 of the headset that is connected to an in-ear device assembly 710 which may be an embodiment of the in-ear assembly 710 depicted in FIG. 7, in accordance with an embodiment. The system 800 may operate in an artificial reality environment, e.g., a virtual reality, an augmented reality, a mixed reality environment, or some combination thereof. The system 800 shown by FIG. 8 comprises a headset 805, an input/output (I/O) interface 815 that is coupled to a console 810, and the in-ear device assembly 710 (described with respect to FIG. 7). The headset 805 may be an embodiment of the headset 100. While FIG. 8 shows an example system 800 including one headset 805 and one I/O interface 815, in other embodiments any number of these components may be included in the system 800. For example, there may be multiple headsets 805 each having an associated I/O interface 815 with each headset 805 and I/O interface 815 communicating with the console 810. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the headset 805.

The headset 805 may be an NED or HMD that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an audio block 820 that receives audio information from the headset 805, the console 810, or both, and presents audio data based on the audio information. In some embodiments, the headset 805 presents virtual content to the user that is based in part on a real environment surrounding the user. For example, virtual content may be presented to a user of the eyewear device. The user physically may be in a room, and virtual walls and a virtual floor of the room are rendered as part of the virtual content.

The headset 805 may include an audio system 820, electronic display 825, an optics block 830, one or more position sensors 835, and an inertial measurement Unit (IMU) 840. The audio system 820 is an embodiment of the audio system 724 depicted in FIG. 7. The electronic display 825 and the optics block 830 is one embodiment of the lens 110 as shown in FIG. 1. The position sensors 835 and the IMU 840 is one embodiment of sensor device 115 as shown in FIG. 1. Some embodiments of the headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The audio system 820 provides audio content (e.g., via the in-ear assembly 710) to the user. In various embodiments, the audio system 820 communicates with the in-ear assembly 710 to provide instructions to a transducer in an in-ear device that is part of the in-ear assembly 710 for generating audio content. The in-ear device is configured such that a portion of the body of the device and transducer components together form the transducer. This configuration facilitates miniaturization of the in-ear device. The audio system 820 may also receive acoustic pressure information via the in-ear assembly 710 (e.g., via the internal and external microphones located in the in-ear device) and use this acoustic pressure information to suitably modify the audio content before providing further instructions to the transducer.

The electronic display 825 displays 2D or 3D images to the user in accordance with data received from the console 810. In various embodiments, the electronic display 825 comprises a single electronic display or multiple electronic displays (e.g., a display for each eye of a user). Examples of the electronic display 825 include: a liquid crystal display (LCD), an organic light emitting diode (OLED) display, an active-matrix organic light-emitting diode display (AMOLED), some other display, or some combination thereof.

The optics system 830 magnifies image light received from the electronic display 825, corrects optical errors associated with the image light, and presents the corrected image light to a user of the headset 805. In various embodiments, the optics system 830 includes one or more optical elements. Example optical elements included in the optics system 830 include: an aperture, a Fresnel lens, a convex lens, a concave lens, a filter, a reflecting surface, or any other suitable optical element that affects image light. Moreover, the optics system 830 may include combinations of different optical elements. In some embodiments, one or more of the optical elements in the optics system 830 may have one or more coatings, such as partially reflective or anti-reflective coatings, Magnification and focusing of the image light by the optics system 830 allows the electronic display 825 to be physically smaller, weigh less, and consume less power than larger displays. Additionally, magnification may increase the field of view of the content presented by the electronic display 825. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

The IMU 840 is an electronic device that generates data indicating a position of the headset 805 based on measurement signals received from one or more of the position sensors 835. A position sensor 835 generates one or more measurement signals in response to motion of the headset 805. Examples of position sensors 835 include: one or more accelerometers, one or more gyroscopes, one or more magnetometers, another suitable type of sensor that detects motion, a type of sensor used for error correction of the IMU 840, or some combination thereof. The position sensors 835 may be located external to the IMU 840, internal to the IMU 840, or some combination thereof.

Based on the one or more measurement signals from one or more position sensors 835, the IMU 840 generates data indicating an estimated current position of the headset 805 relative to an initial position of the headset 805. For example, the position sensors 835 include multiple accelerometers to measure translational motion (forward/back, up/down, left/right) and multiple gyroscopes to measure rotational motion (e.g., pitch, yaw, and roll). In some embodiments, the IMU 840 rapidly samples the measurement signals and calculates the estimated current position of the headset 805 from the sampled data. For example, the IMU 840 integrates the measurement signals received from the accelerometers over time to estimate a velocity vector and integrates the velocity vector over time to determine an estimated current position of a reference point on the headset 805. Alternatively, the IMU 840 provides the sampled measurement signals to the console 810, which interprets the data to reduce error. The reference point is a point that may be used to describe the position of the headset 805. The reference point may generally be defined as a point in space or a position related to the eyewear device's 805 orientation and position.

The IMU 840 receives one or more parameters from the console 810. As further discussed below, the one or more parameters are used to maintain tracking of the headset 805. Based on a received parameter, the IMU 840 may adjust one or more IMU parameters (e.g., sample rate). In some embodiments, certain parameters cause the IMU 840 to update an initial position of the reference point so it corresponds to a next position of the reference point. Updating the initial position of the reference point as the next calibrated position of the reference point helps reduce accumulated error associated with the current position estimated the IMU 840. The accumulated error, also referred to as drift error, causes the estimated position of the reference point to "drift" away from the actual position of the reference point over time. In some embodiments of the headset 805, the IMU 840 may be a dedicated hardware component. In other embodiments, the IMU 840 may be a software component implemented in one or more processors.

The I/O interface 815 is a device that allows a user to send action requests and receive responses from the console 810. An action request is a request to perform a particular action. For example, an action request may be an instruction to start or end capture of image or video data, or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 840, as further described above, that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the headset 805 for processing in accordance with information received from one or more of: the headset 805 and the I/O interface 815. In the example shown in FIG. 8, the console 810 includes an application store 850, a tracking module 855 and an engine 845. Some embodiments of the console 810 have different modules or components than those described in conjunction with FIG. 8. Similarly, the functions further described below may be distributed among components of the console 810 in a different manner than described in conjunction with FIG. 8.

The application store 850 stores one or more applications for execution by the console 810. An application is a group of instructions, that when executed by a processor, generates content for presentation to the user. Content generated by an application may be in response to inputs received from the user via movement of the headset 805 or the I/O interface 815. Examples of applications include: gaming applications, conferencing applications, video playback applications, or other suitable applications.

The tracking module 855 calibrates the system environment 800 using one or more calibration parameters and may adjust one or more calibration parameters to reduce error in determination of the position of the headset 805 or of the I/O interface 815. Calibration performed by the tracking module 855 also accounts for information received from the IMU 840 in the headset 805 and/or an IMU 840 included in the I/O interface 815. Additionally, if tracking of the headset 805 is lost, the tracking module 855 may re-calibrate some or all of the system environment 800.

The tracking module 855 tracks movements of the headset 805 or of the I/O interface 815 using information from the one or more position sensors 835, the IMU 840 or some combination thereof. For example, the tracking module 855 determines a position of a reference point of the headset 805 in a mapping of a local area based on information from the headset 805. The tracking module 855 may also determine positions of the reference point of the headset 805 or a reference point of the I/O interface 815 using data indicating a position of the headset 805 from the IMU 840 or using data indicating a position of the I/O interface 815 from an IMU 840 included in the I/O interface 815, respectively. Additionally, in some embodiments, the tracking module 855 may use portions of data indicating a position or the headset 805 from the IMU 840 to predict a future location of the headset 805. The tracking module 855 provides the estimated or predicted future position of the headset 805 or the I/O interface 815 to the engine 845.

The engine 845 also executes applications within the system environment 800 and receives position information, acceleration information, velocity information, predicted future positions, or some combination thereof, of the headset 805 from the tracking module 855. Based on the received information, the engine 845 determines content to provide to the headset 805 for presentation to the user. For example, if the received information indicates that the user has looked to the left, the engine 845 generates content for the headset 805 that mirrors the user's movement in a virtual environment or in an environment augmenting the local area with additional content. Additionally, the engine 845 performs an action within an application executing on the console 810 in response to an action request received from the I/O interface 815 and provides feedback to the user that the action was performed. The provided feedback may be visual or audible feedback via the headset 805 or haptic feedback via the I/O interface 815.

The in-ear device assembly 710 include an in-ear device for each ear. In some embodiments, the in-ear device assemblies 710 may provide data regarding the airborne acoustic pressure waves generated in the ear canal and/or from the local area to the audio system 820. The in-ear device assembly 710 is an embodiment of the in-ear device assembly 710 depicted in FIG. 7.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An in-ear device comprising:
    a transducer configured to output audio content into an ear canal of a user;
    a driver assembly configured to drive a diaphragm to produce the audio content;
    an external microphone configured to detect sound from a local area of the user; and
    an internal microphone configured to detect sound from within the ear canal,
    wherein the external microphone is located in a first section of the in-ear device that comprises an external shell located on a first end of the transducer, the transducer is located in a second section of the in-ear device, and the internal microphone is located in a third section of the in-ear device that comprises an internal shell located on a second end of the transducer, each section having a different central axis.

2. The in-ear device of claim 1, wherein:
    the driver assembly comprises a driver external magnet, a driver internal magnet, and a coil; and
    the driver external magnet is coupled to a portion of an inner wall of the in-ear device.

3. The in-ear device of claim 1, further comprising a body that houses the transducer, the driver assembly, the external microphone, and the internal microphone.

4. The in-ear device of claim 3, wherein a first end of the body comprises an external plate that is configured to face into the local area, the external plate including an external port through which sound from the local area enters the body.

5. The in-ear device of claim 4, wherein the external port is located on the external plate in a position that is offset from a central axis of the external plate.

6. The in-ear device of claim 5, wherein the external microphone is located on an inner wall of the external plate, and wherein the external microphone is offset from the central axis of the external plate.

7. The in-ear device of claim 4, wherein the external port and the external microphone are both located on the central axis of the external plate.

8. The in-ear device of claim 4, wherein a second end of the body that is configured to face into the ear canal comprises an internal plate, the internal plate including an internal port through which sound from the ear canal enters the body.

9. The in-ear device of claim 8, wherein the second end of the body comprises a mesh cover, and wherein the mesh forms the internal port.

10. The in-ear device of claim 9, wherein the mesh cover is a mesh dome, and wherein the internal microphone is located under the mesh dome.

11. The in-ear device of claim 3, wherein the body has a first end and a second end that is opposite the first end, and the first end is configured to face into the local area, and the second end is configured to face into the ear canal, and an external port is located on the first end of the body and one or more internal ports are located on the second end of the body.

12. The in-ear device of claim 1, further comprising an internal port that is a dedicated internal port for the internal microphone.

13. The in-ear device of claim 1, further comprising an internal port that is a dedicated internal port to output the audio content from the transducer to the ear canal.

14. The in-ear device of claim 1, further comprising an internal port that is shared for use by the internal microphone as well as to output the audio content from the transducer to the ear canal.

15. The in-ear device of claim 1, wherein a section is canted with respect to a neighboring section.

16. The in-ear device of claim 1 wherein the external shell of the first section has greater volume than the external shell of the third section.

17. The in-ear device of claim 1, wherein the transducer receives instructions for generating the audio content from a device that is external to the in-ear device.

18. The in-ear device of claim 17, wherein the device that is external to the in-ear device is a headset that is worn by a user of the device.

19. The in-ear device of claim 18, further comprising:
   a controller configured to:
      receive audio content for presentation to the user; and
      instruct the transducer to present the received audio content to the user.

\* \* \* \* \*